United States Patent
Kurata et al.

(10) Patent No.: US 11,404,047 B2
(45) Date of Patent: Aug. 2, 2022

(54) FEATURE AND FEATURE VARIANT RECONSTRUCTION FOR RECURRENT MODEL ACCURACY IMPROVEMENT IN SPEECH RECOGNITION

(71) Applicant: INTERNATIONAL BUSINESS MACHINES CORPORATION, Armonk, NY (US)

(72) Inventors: Gakuto Kurata, Tokyo (JP); Kartik Audhkhasi, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 447 days.

(21) Appl. No.: 16/297,052

(22) Filed: Mar. 8, 2019

(65) Prior Publication Data
US 2020/0286464 A1  Sep. 10, 2020

(51) Int. Cl.
*G10L 15/08* (2006.01)
*G10L 15/06* (2013.01)
*G10L 15/16* (2006.01)
*G06N 3/08* (2006.01)
*G06N 3/04* (2006.01)

(52) U.S. Cl.
CPC .......... *G10L 15/083* (2013.01); *G06N 3/0454* (2013.01); *G06N 3/08* (2013.01); *G10L 15/063* (2013.01); *G10L 15/16* (2013.01)

(58) Field of Classification Search
CPC ..... G10L 15/083; G10L 16/063; G10L 15/16; G06N 3/0454; G06N 3/08
See application file for complete search history.

(56) References Cited

U.S. PATENT DOCUMENTS

| | | | |
|---|---|---|---|
| 2015/0161522 A1* | 6/2015 | Saon | G06N 3/0454 706/12 |
| 2017/0053644 A1 | 2/2017 | Rennie et al. | |
| 2018/0082172 A1 | 3/2018 | Patel et al. | |
| 2018/0330718 A1* | 11/2018 | Hori | G06N 7/005 |
| 2019/0188567 A1* | 6/2019 | Yao | G06N 3/08 |
| 2020/0135174 A1* | 4/2020 | Cui | G10L 25/03 |
| 2020/0219486 A1* | 7/2020 | Fu | G10L 15/10 |

OTHER PUBLICATIONS

Zhe et al, "An Improved Hybrid CTC-Attention Model for Speech Recognition", Nov. 1, 2018, arXiv, whole document (Year: 2018).*

(Continued)

*Primary Examiner* — Sonia L Gay
(74) *Attorney, Agent, or Firm* — Tutunjian & Bitetto, P.C.; Randall Bluestone (57) ABSTRACT

A multi-task learning system is provided for speech recognition. The system includes a common encoder network. The system further includes a primary network for minimizing a Connectionist Temporal Classification (CTC) loss for speech recognition. The system also includes a sub network for minimizing a Mean squared error (MSE) loss for feature reconstruction. A first set of output data of the common encoder network is received by both of the primary network and the sub network. A second set of the output data of the common encode network is received only by the primary network from among the primary network and the sub network.

18 Claims, 10 Drawing Sheets

(56) References Cited

OTHER PUBLICATIONS

Pironkov et al., "Speaker-Aware Multi-Task Learning for Automatic Speech Recognition", ResearchGate, 23rd International Conference on Pattern Recognition • ICPR 2016, Dec. 2016, 7 pages.
Yu et al., "Recent Progresses in Deep Learning based Acoustic Models (Updated)", arXiv:1804.09298v2 [eess.AS] Apr. 27, 2018, pp. 1-16.

* cited by examiner

FEATURE AND FEATURE VARIANT RECONSTRUCTION FOR RECURRENT MODEL ACCURACY IMPROVEMENT IN SPEECH RECOGNITION

BACKGROUND

Technical Field

The present invention generally relates to speech recognition, and more particularly to feature and feature variant reconstruction for recurrent model accuracy improvement in speech recognition.

Description of the Related Art

Recurrent models have shown a strong performance for acoustic modeling and end-to-end modeling for speech recognition. Due to its strong modeling capability, overfitting to the training data (memorizing the training data completely) can be an issue for recurrent models. Multi-task learning can prevent overfitting, but preparing an appropriate auxiliary task is sometimes expensive. Thus, there is a need for an improved approach that, in turn, improves the accuracy of a recurrent model used for speech recognition.

SUMMARY

According to an aspect of the present invention, a multi-task learning system is provided for speech recognition. The system includes a common encoder network. The system further includes a primary network for minimizing a Connectionist Temporal Classification (CTC) loss for speech recognition. The system also includes a sub network for minimizing a Mean squared error (MSE) loss for feature reconstruction. A first set of output data of the common encoder network is received by both of the primary network and the sub network. A second set of the output data of the common encode network is received only by the primary network from among the primary network and the sub network.

According to another aspect of the present invention, a computer-implemented method is provided for speech recognition. The method includes outputting, by a common encoder network, a first set of output data and a second set of output data. The method further includes minimizing, by a primary network, a Connectionist Temporal Classification (CTC) loss for speech recognition. The method also includes minimizing, by a sub network, a Mean squared error (MSE) loss for feature reconstruction. A first set of output data of the common encoder network is received by both of the primary network and the sub network. A second set of the output data of the common encode network is received only by the primary network from among the primary network and the sub network.

According to yet another aspect of the present invention, a computer program product is provided for speech recognition. The computer program product includes a non-transitory computer readable storage medium having program instructions embodied therewith. The program instructions are executable by a computer to cause the computer to perform a method. The method includes outputting, by a common encoder network of the computer, a first set of output data and a second set of output data. The method further includes minimizing, by a primary network of the computer, a Connectionist Temporal Classification (CTC) loss for speech recognition. The method also includes minimizing, by a sub network of the computer, a Mean squared error (MSE) loss for feature reconstruction. A first set of output data of the common encoder network is received by both of the primary network and the sub network. A second set of the output data of the common encode network is received only by the primary network from among the primary network and the sub network.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to feature and feature variant reconstruction for recurrent model accuracy improvement in speech recognition. To that end, the present invention can improve the accuracy of a recurrent model used for speech recognition by using feature reconstruction and its variants as a regularizer. As used herein, the term "regularizer" refers to a mechanism to prevent the trained model from overfitting to training data.

In an embodiment, the present invention can be used for any of one or more acoustic models used to recognize speech from an acoustic utterance.

Advantageously, the present invention can avoid or mitigate overfitting to training data, thus overcoming this limitation of the prior art. Exemplary recurrent models to which the present invention can be applied include, but are not limited to, Recurrent Neural Networks (RNNs), Long Short Term Memories (LSTMs), and so forth.

In an embodiment, the speech recognition accuracy of recurrent models is improved by multi-task learning with input feature reconstruction as an auxiliary task. That is, in an embodiment, feature reconstruction is used in an auxiliary task in multi-task learning.

In an embodiment, input features are distorted only in the auxiliary task in order to suppress long-span dependencies in the time domain. By using input feature reconstruction as an auxiliary task that can be prepared without any manual efforts, speech recognition accuracy can be improved.

In an embodiment, tasks are switched with minimizing respective losses so as to accept the undistorted feature in the main task and the distorted feature in the auxiliary task. By distorting features in the auxiliary task, local dependencies in the time domain can be learned while long-spanning dependencies can be discarded.

Figure 1:
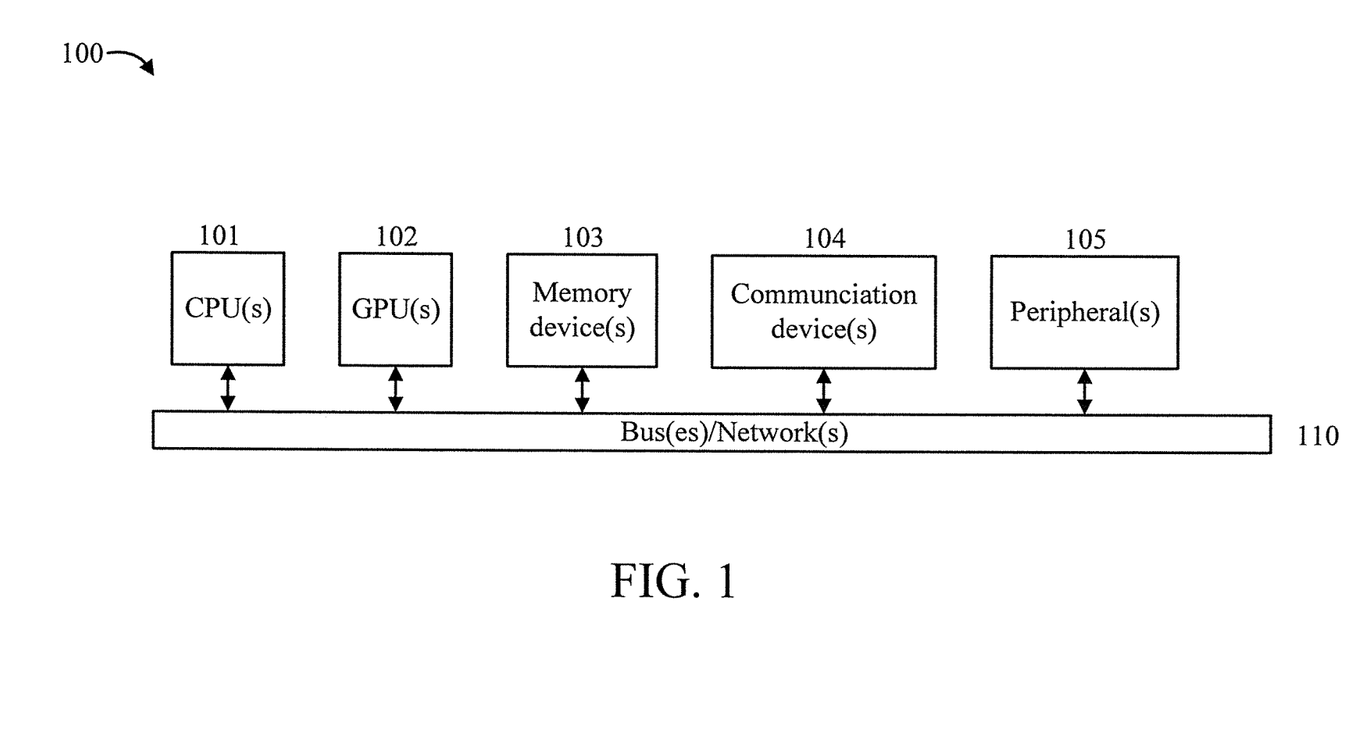
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device (e.g., a microphone), a printer, an imaging device, and so forth. Elements of processing system 100 are connected by one or more buses or networks (collectively denoted by the figure reference numeral 110).

In an embodiment, memory devices 103 can store specially programmed software modules in order to transform the computer processor system in a special purpose computer configured to implement speech recognition in accordance with various aspects of the present invention. In an embodiment, special purpose hardware (e.g., Application Specific Integrated Circuits, and so forth) can be used to implement various aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 9-10). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
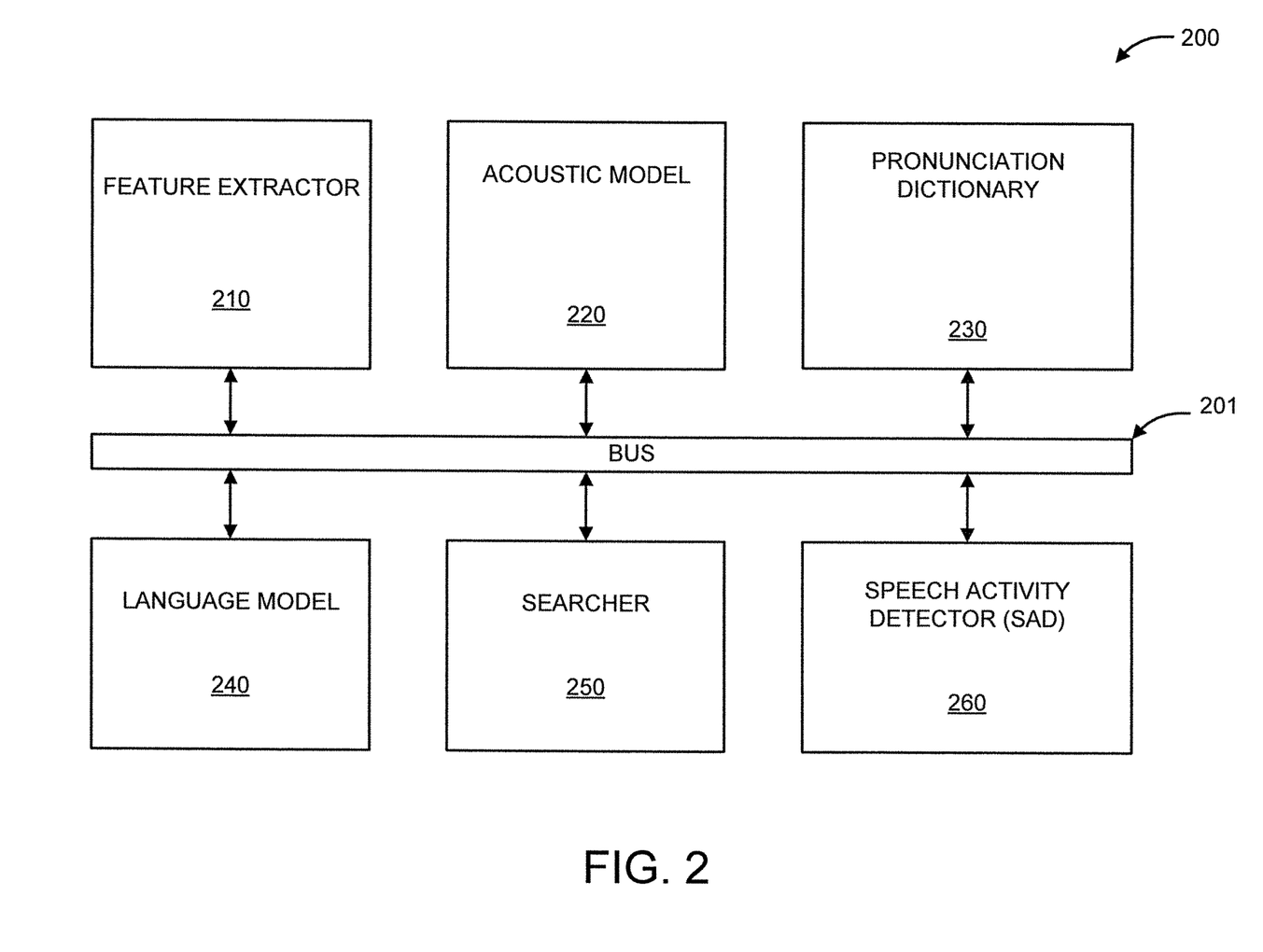
FIG. 2 shows an exemplary Automatic Speech Recognition (ASR) system, in accordance with an embodiment of the present principles.

FIG. 2 shows an exemplary Automatic Speech Recognition (ASR) system 200, in accordance with an embodiment of the present principles.

The ASR system 200 includes a feature extractor 210, an acoustic model 220, a pronunciation dictionary 230, a language model 240, a searcher 250, and a speech activity detector 260.

The searcher 250 performs a search using inputs provided from the feature extractor 210, the acoustic model 220, the pronunciation dictionary 230, and the language model 240 to output one or more words representative of a decoded acoustic utterance. While mentioned in singular form, the feature extractor 210, the acoustic model 220, the pronunciation dictionary 230, and the language model can each include more than one of that element. For example, the acoustic model 220 can include multiple acoustic models, at least two being of a different type.

In a word recognition task, given an acoustic signal corresponding to a sequence of words $X=x1, x2, \ldots, xn$, the feature extractor 210 first generates a compact representation of the input as sequence of feature vectors $Y=y1, y2, \ldots, yt$. Some exemplary features that can be extracted by the feature extractor 210 include, but are not limited to, signal energy, pitch, zero crossing rate, and so forth. It is to be appreciated that the preceding features are merely illustrative and, thus, other features can also be extracted in accordance with the teachings of the present principles, while maintaining the spirit of the present principles.

The acoustic model 220, the pronunciation dictionary 230, and the language model 240 are then used by the searcher 250 to find the most probable word sequence X given these feature vectors. This is done by expressing the desired probability $p(X|Y)$ using Bayes theorem as follows:

$$\hat{X} = \underset{X}{\operatorname{argmax}}\, p^{(X|Y)} = \underset{X}{\operatorname{argmax}} \frac{p(Y|X)p(X)}{p(Y)}$$

where p(X) is the a priori probability of observing a sequence of words in the language, independent of any acoustic evidence and is modeled using the language model component. p(X) corresponds to the likelihood of the acoustic features Y being generated given the word sequence X.

The language model 240 and the acoustic model 220 can be stochastic models trained using large amounts training data. Hidden Markov Models (HMMs) or a hybrid combination of neural networks and HMMs can be used to implement acoustic model 220.

For large vocabulary speech recognition, not all words have an adequate number of acoustic examples in the training data. The acoustic data also covers only a limited vocabulary of words. Instead of modeling incorrect probability distributions of entire words or utterances using limited examples, the acoustic model 220 is built for basic speech sounds. By using these basic units, the system 200 can also recognize words without acoustic training examples. It is to be appreciated that the basic speech sounds can be context independent phones or context dependent phones or any other such speech sounds.

To compute the likelihood $p(Y|X)$, each word in the hypothesized word sequence X is first broken down into its constituent phones using the pronunciation dictionary 230. A single composite acoustic model for the hypothesis is constructed by combining individual phone HMMs. In practice, to account for the large variability of basic speech sounds, HMMs of context dependent speech units with continuous density output distributions can be used. There exist efficient algorithms like the Baum-Welch algorithm to learn the parameters of the acoustic model from training data. Neural network based acoustic models can be used instead of, or in addition to, HMM-GMM based models.

The language model 240 generates the a priori probability p(x). The language model 240 can be an N-gram based language model(s), where typically bi-grams or tri-grams are used. Although p(x) is the probability of a sequence of words, N-grams model this probability assuming the probability of any word xi depends on only N−1 preceding words. These probability distributions are estimated from simple frequency counts that can be directly obtained from large amounts of text. To account for the inability to estimate counts for all possible N-gram sequences, techniques like discounting and back-off are used. The language model 240 can be, but is not limited to, a Neural Network based language model and/or a class based language model.

The speech activity detector 260 detects speech in an input signal that includes one or more acoustic utterances uttered by a speaker, so that the subsequent steps of speech recognition can focus on the speech portions of the input signal.

In the embodiment shown in FIG. 2, the elements thereof are interconnected by a bus(es)/network(s) 201. However, in other embodiments, other types of connections can also be used. Moreover, in an embodiment, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 2 can be implemented in a cloud configuration including, for example, in a distributed configuration. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present principles provided herein, while maintaining the spirit of the present principles. Moreover, it is to be appreciated that other types and configurations of a speech recognition system can also be used in accordance with the teachings of the present principles, while maintaining the spirit of the present principles. For example, template matching based systems using forms of dynamic time warping can be used, a probabilistic language model could be replaced by a rule based grammar model, and so forth. The ASR system can also be simple recognizer just recognizing phonemes, it could be a simple isolated word recognizer, a digit recognizer based on rules or a large vocabulary continuous speech recognizer, the components of which we have described. These and other types of speech recognition systems and constituent elements are readily determined by one of ordinary skill in the art, given the teachings of the present principles provided herein, while maintaining the spirit of the present principles.

The above explanation of speech recognition is for the conventional hybrid modeling. More recent end-to-end modeling is described below.

In a case of end-to-end modeling, p(X|Y) is directly computed. The output sequence of X can be word sequences, sub-word sequences, phone sequences, and so forth. In the case when a word is used as output, the output of the end-to-end model can be used as speech recognition results. When using other units, such as phones, for an output sequence of X, language models are incorporated during the search after computing p(X|Y).

Please note that this invention can be used for the acoustic model using recurrent models in the hybrid modeling and the end-to-end models using recurrent models.

Figure 3:
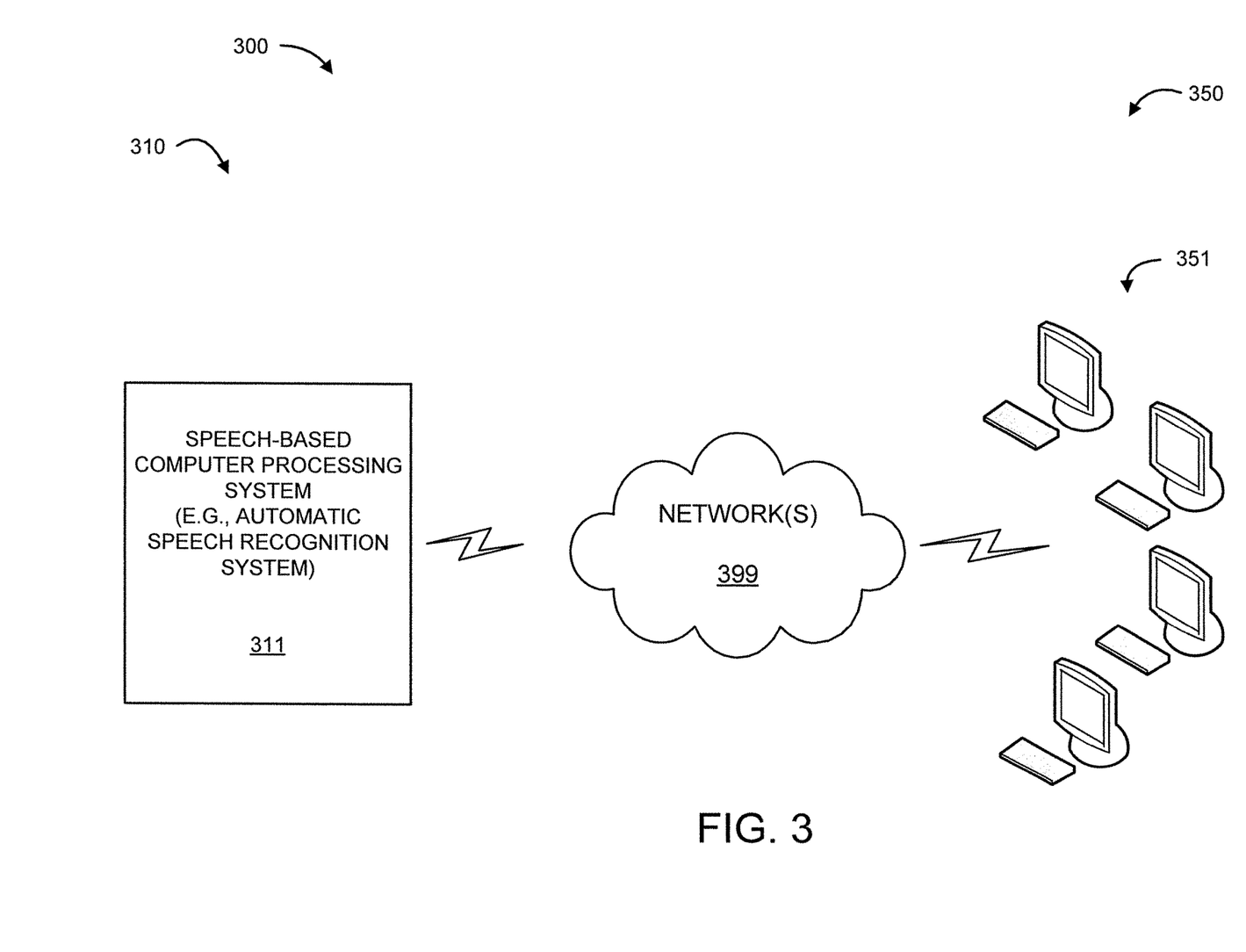
FIG. 3 shows an exemplary operating environment to which the present principles can be applied, in accordance with an embodiment of the present principles.

FIG. 3 shows an exemplary operating environment 300 to which the present principles can be applied, in accordance with an embodiment of the present principles.

The environment 300 involves a server side 310 and a client side 350.

The server side 310 includes a speech-based computer processing system. For illustrative purposes, the speech-based computer processing system is an automatic speech recognition system (ASR) 311. The ASR 311 has improved speech recognition accuracy in accordance with the present principles. In an embodiment, ASR 311 can be implemented as ASR 200 from FIG. 2. However, it is to be appreciated that block 311 can represent any speech-based computer processing system that involves one or more of the following: speech recognition; speaker identification; speaker verification; speaker diarisation; language identification; keyword spotting; emotion detection; automatic translation; court reporting; hands-free computing; home automation; mobile telephony; and so forth.

The client side 350 includes a set of workstations 351.

Users at the workstations 351 can engage in and/or otherwise use speech recognition sessions. The speech recognition sessions can relate, but are not limited to, customer service, voice dialing, machine control, data searching, data entry, system/facility/entity access, and so forth.

Communications between the server side 310 and the client side 350 are made through one or more networks 399.

Figure 4:
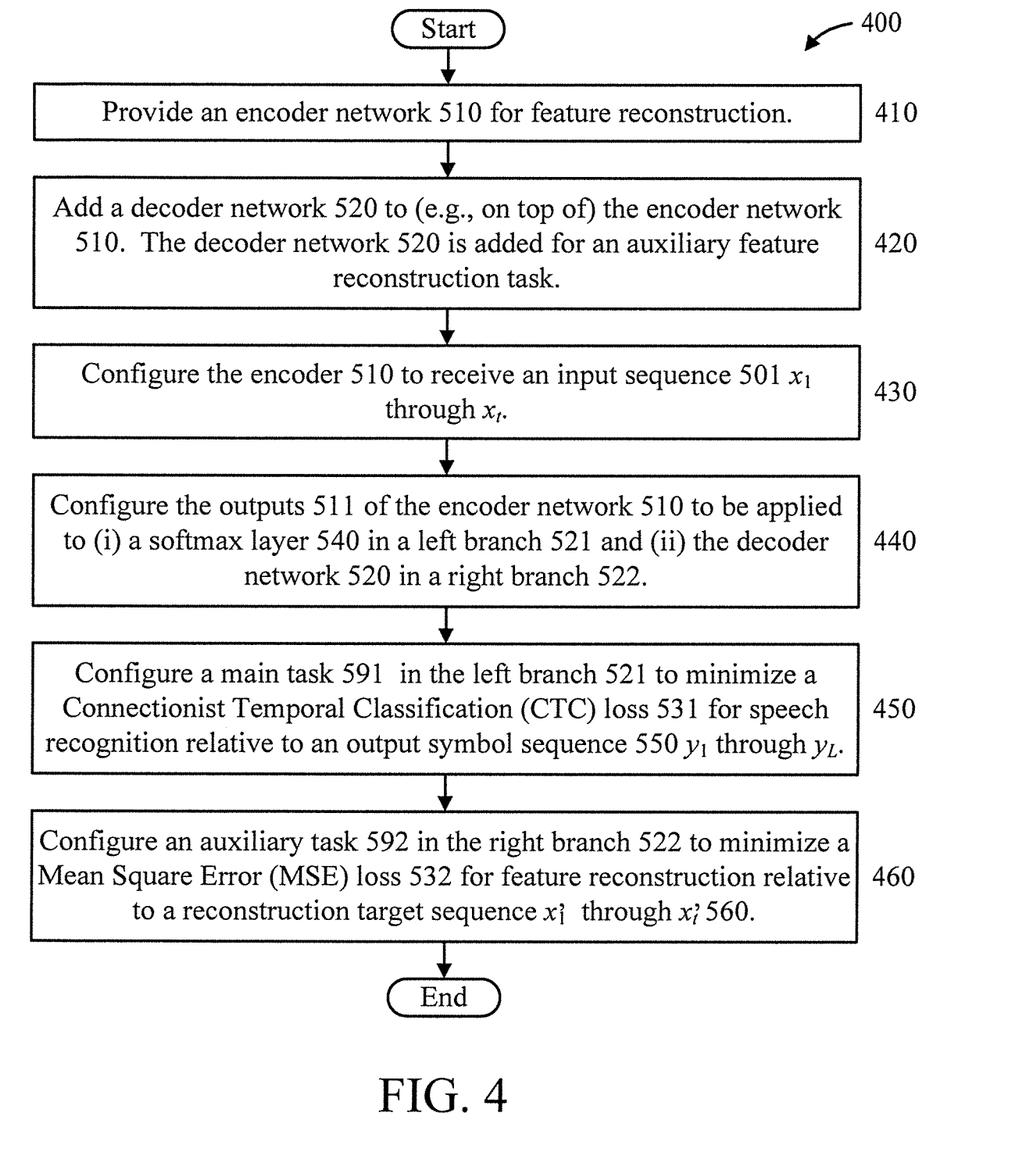
FIG. 4 is a flow diagram showing an exemplary method for improving the accuracy of a recurrent model used for speech recognition, in accordance with an embodiment of the present invention.
Figure 5:
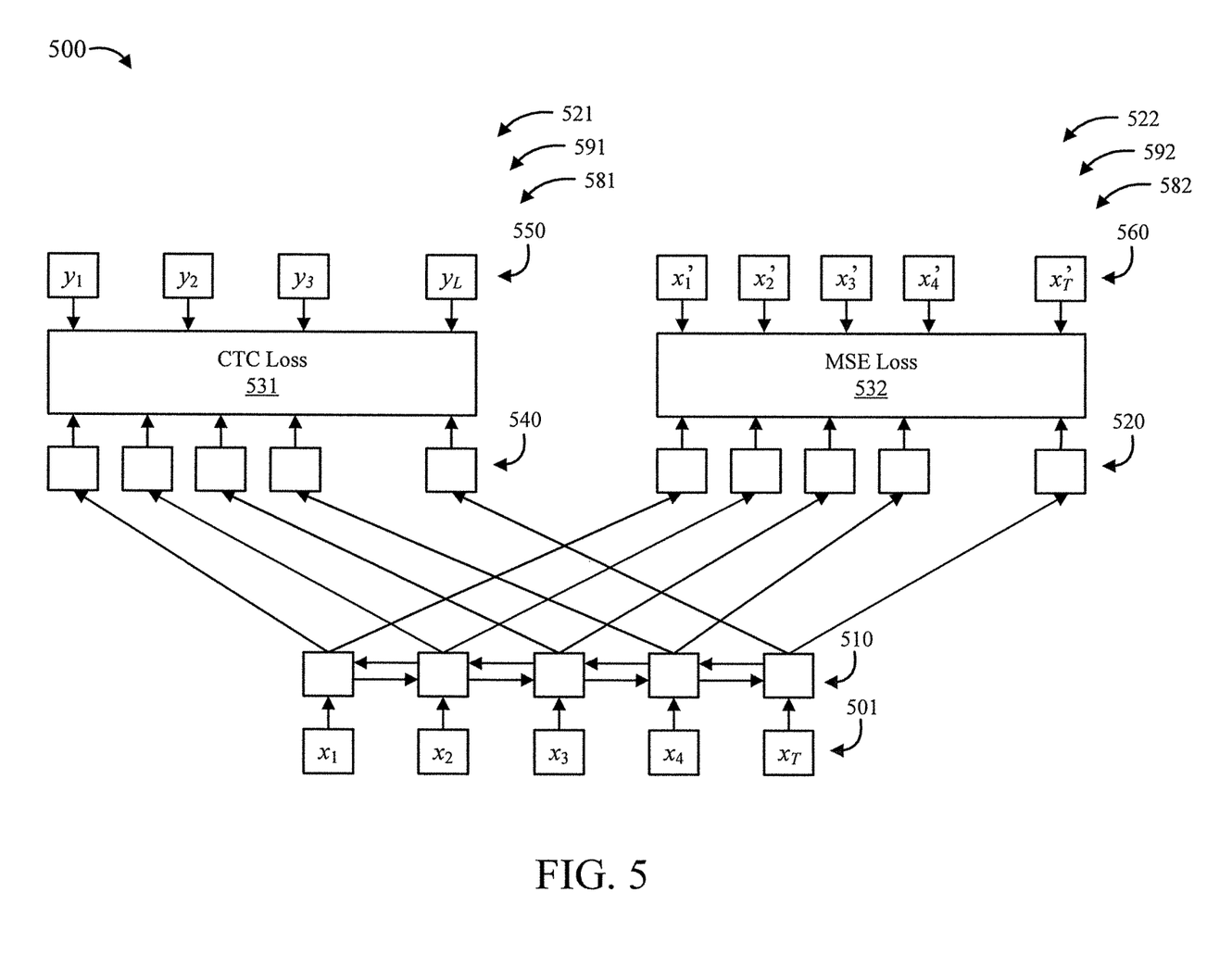
FIG. 5 is a block diagram showing an exemplary neural network architecture for multi-task learning, in accordance with an embodiment of the present invention.

FIG. 4 is a flow diagram showing an exemplary method 400 for improving the accuracy of a recurrent model used for speech recognition, in accordance with an embodiment of the present invention. FIG. 5 is a block diagram showing an exemplary neural network architecture 500 for multi-task learning, in accordance with an embodiment of the present invention.

Referring to FIG. 5, in an embodiment, the neural network architecture include a common encoder portion 510, also referred as encoder network, a primary network 581 for performing a primary or main task, and a sub network 582 for performing an auxiliary task. The primary network 581 includes a left or primary branch 521 and the sub network 582 includes a right or auxiliary branch 522. The auxiliary task is configured to reconstruct the input sequence 501. Note that $x'_1, x'_2, \ldots, x'_T$ indicates the full reconstruction target that is same with the input sequence 501 $x_1, x_2, \ldots, x_T$ or static-only reconstruction target derived from the input sequence 501.

Referring to FIGS. 4-5, at block 410, provide an encoder network 510 for feature reconstruction. In an embodiment, the encoder network 510 can include, for example, a bi-directional LSTM encoder. Of course, other types of encoders and encoder networks can be used, as readily appreciated by one of ordinary skill in the art, given the teachings of the present invention provided herein.

At block 420, add a decoder network 520 to (e.g., on top of) the encoder network 510. The decoder network 520 is added for an auxiliary feature reconstruction task.

At block 430, configure the encoder 510 to receive an input sequence 501 $x_1$ through $x_t$.

At block 440, configure the outputs 511 of the encoder network 510 to be applied to (i) a softmax layer 540 in a left branch 521 and (ii) the decoder network 520 in a right branch 522.

At block 450, configure a main task 591 in the left branch 521 to minimize a Connectionist Temporal Classification (CTC) loss 531 for speech recognition relative to an output symbol sequence 550 $y_1$ through $y_L$.

At block 460, configure an auxiliary task 592 in the right branch 522 to minimize a Mean Square Error (MSE) loss 532 for feature reconstruction relative to a reconstruction target sequence $x_1'$ through $x'_T$ 560.

Hence, the auxiliary task 592 is configured to reconstruct the input sequence 501. Note that $x'_1, x'_2, \ldots, x'_T$ indicates the full reconstruction target that is same with the input sequence 501 $x_1, x_2, \ldots, x_T$.

Figure 6:
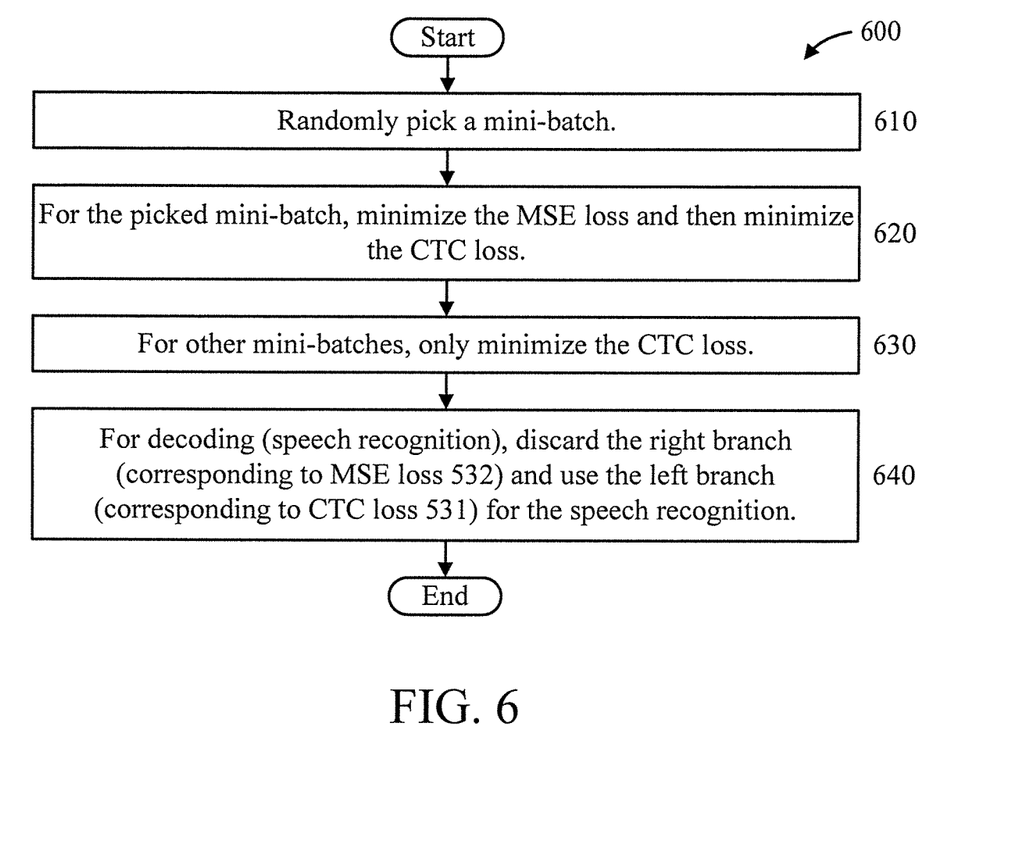
FIG. 6 is a flow diagram showing an exemplary method for training and using a recurrent model for speech recognition, in accordance with an embodiment of the present invention.
Figure 7:
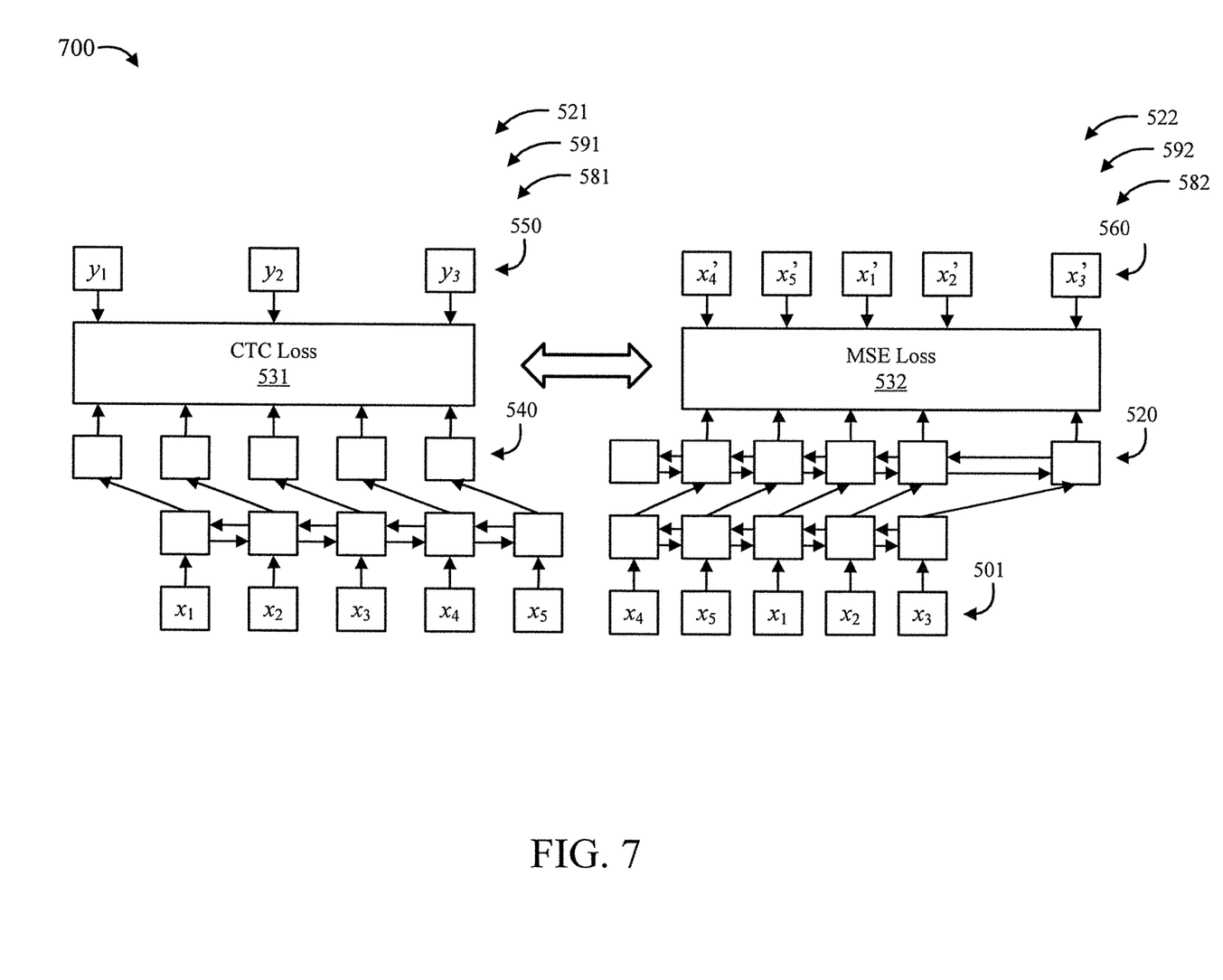
FIG. 7 is a block diagram showing exemplary multi-task CTC training architecture with auxiliary feature reconstruction, in accordance with an embodiment of the present invention.

FIG. 6 is a flow diagram showing an exemplary method 600 for training and using a recurrent model for speech recognition, in accordance with an embodiment of the present invention. FIG. 7 is a block diagram showing exemplary multi-task CTC training architecture 700 with auxiliary feature reconstruction, in accordance with an embodiment of the present invention.

Referring to FIG. 6, during training, we randomly pick a mini-batch with a certain ratio where this ratio can be set empirically through a preceding small experiment. For the picked mini-batch, the MSE loss for feature reconstruction is first minimized, and then the CTC loss is minimized. For other mini-batches, we only minimize the CTC loss. Note that this is an example of using the swap reconstruction feature in the auxiliary task.

Referring to FIGS. 6-7, at block 410, provide an encoder network 510 for feature reconstruction. In an embodiment, the encoder network 510 can include, for example, a bi-directional LSTM encoder. Of course, other types of encoders and encoder networks can be used, as readily appreciated by one of ordinary skill in the art, given the teachings of the present invention provided herein.

At block 420, add a decoder network 520 to (e.g., on top of) the encoder network 510. The decoder network 520 is added for an auxiliary feature reconstruction task.

At block 430, configure the encoder 510 to receive an input sequence 501 $x_1$ through $x_t$.

At block 540, configure the outputs 511 of the encoder network 510 to be applied to (i) a softmax layer 540 in a left branch 521 and (ii) the decoder network 520 in a right branch 522.

At block 550, configure a main task 591 in the left branch 521 to minimize Connectionist Temporal Classification (CTC) loss 531 for speech recognition relative to an output symbol sequence 550 $y_1$ through $y_L$.

At block 560, configure an auxiliary task 592 in the right branch 522 to minimize Mean Square Error (MSE) loss 532 for feature reconstruction relative to a reconstruction target sequence $x_1'$ through $x'_T$ 560.

Hence, the auxiliary task 592 is configured to reconstruct the input sequence. Note that $x'_1, x'_2, \ldots, x'_T$ indicates the full reconstruction target that is same with the input sequence 501 $x_1, x_2, \ldots, x_T$.

FIG. 6 is a flow diagram showing an exemplary method 600 for training and using a recurrent model for speech recognition, in accordance with an embodiment of the present invention. FIG. 7 is a block diagram showing exemplary multi-task CTC training architecture 700 with auxiliary feature reconstruction, in accordance with an embodiment of the present invention.

Referring to FIGS. 6-7, at block 610, randomly pick a mini-batch.

At block 620, for the picked mini-batch, minimize the MSE loss and then minimize the CTC loss.

At block 630, for other mini-batches, only minimize the CTC loss.

At block 640, for decoding (speech recognition), discard the right branch (corresponding to MSE loss 532) and use the left branch (corresponding to CTC loss 531) for the speech recognition.

Figure 8:
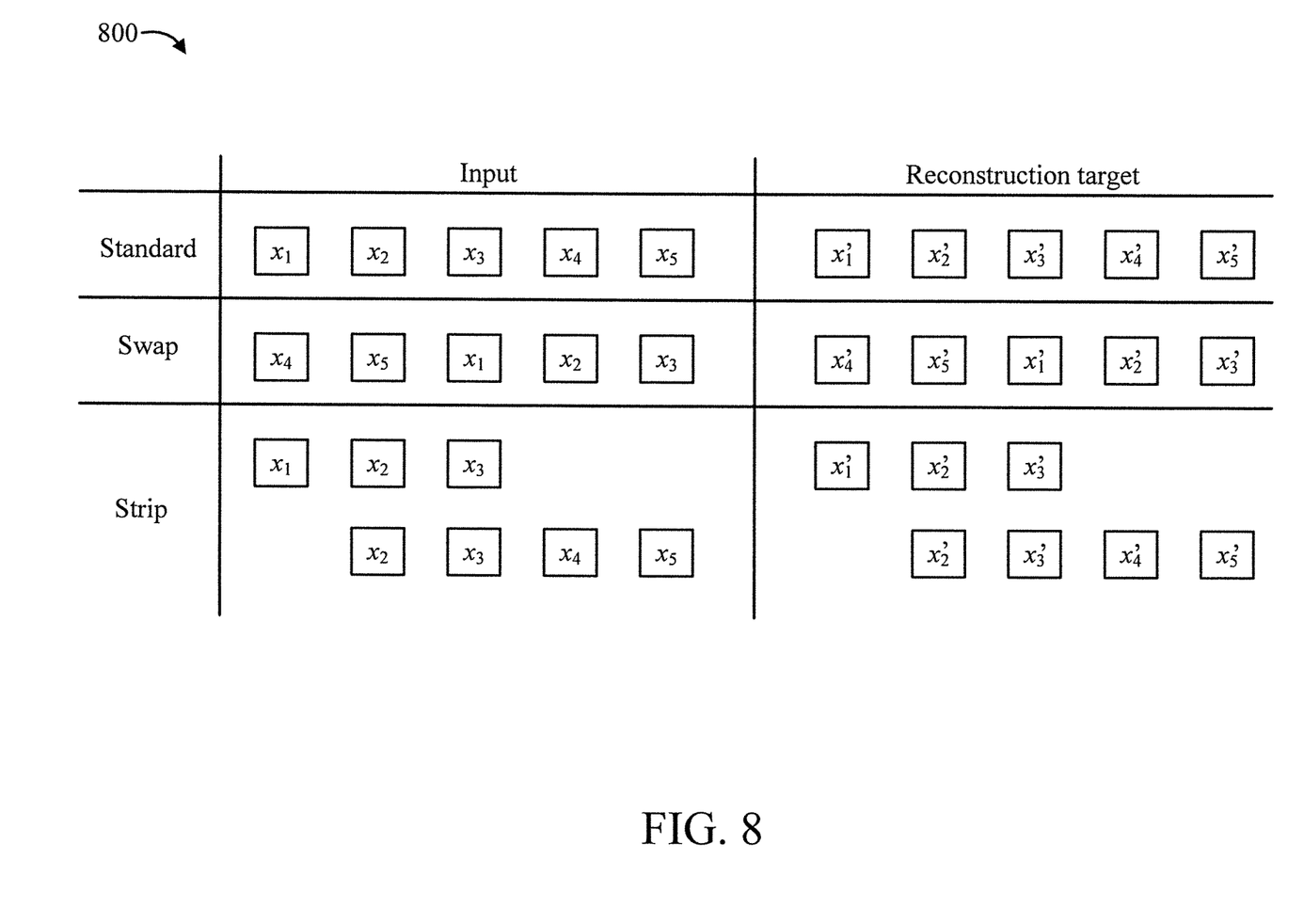
FIG. 8 is a block diagram showing an exemplary feature distortion for the auxiliary reconstruction task, in accordance with an embodiment of the present invention.

It is to be noted that the preceding method 600 is an example of using the swap feature reconstruction in the auxiliary task 592, that is, switch the main task 591 and auxiliary 592 task and the minimize respective losses FIG. 8 is a block diagram showing an exemplary feature distortion 800 for the auxiliary reconstruction task, in accordance with an embodiment of the present invention.

The original input sequence is $x_1, x_2, \ldots, x_5$ as used in the standard reconstruction. The former and latter parts are swapped in the swap reconstruction and beginning and end parts are stripped in the strip reconstruction. It is to be noted that the original input sequence is used in the main task of CTC training regardless of feature reconstruction types.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
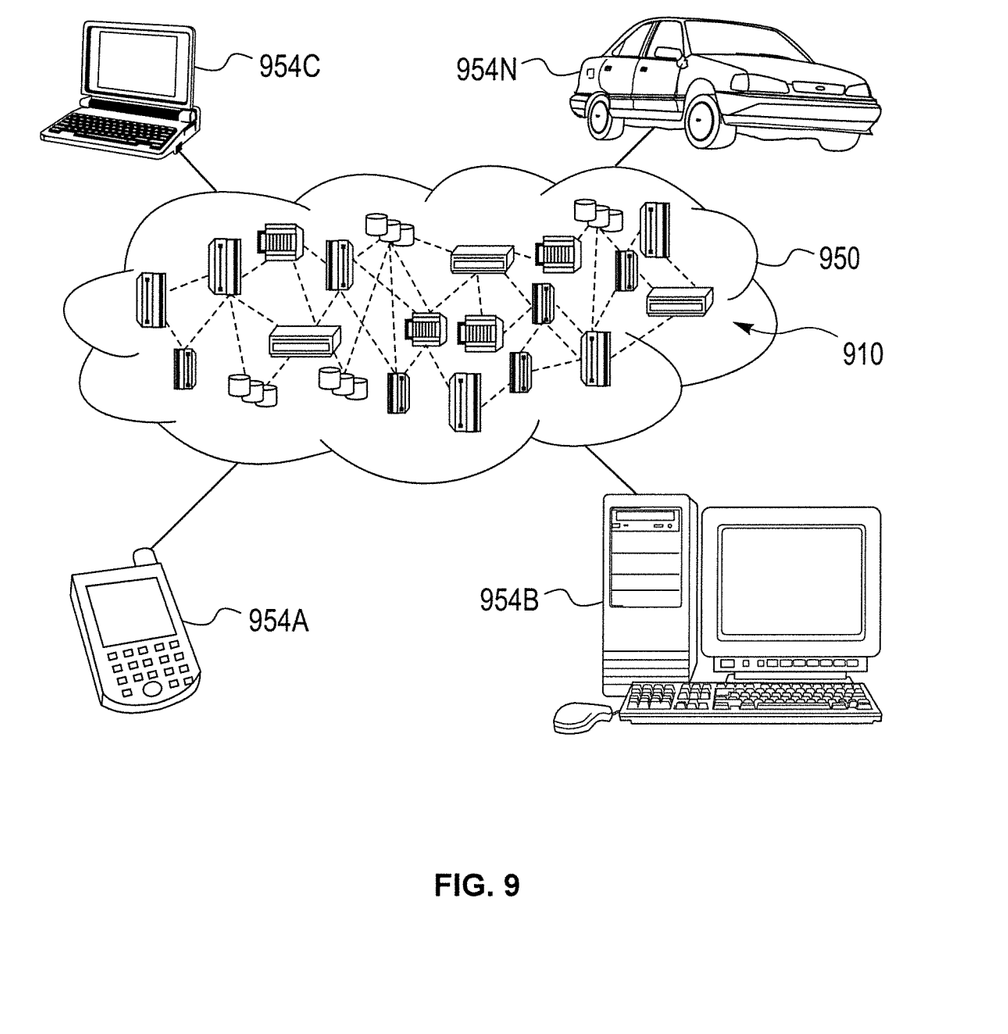
FIG. 9 is a block diagram showing an illustrative cloud computing environment having one or more cloud computing nodes with which local computing devices used by cloud consumers communicate, in accordance with an embodiment of the present invention.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
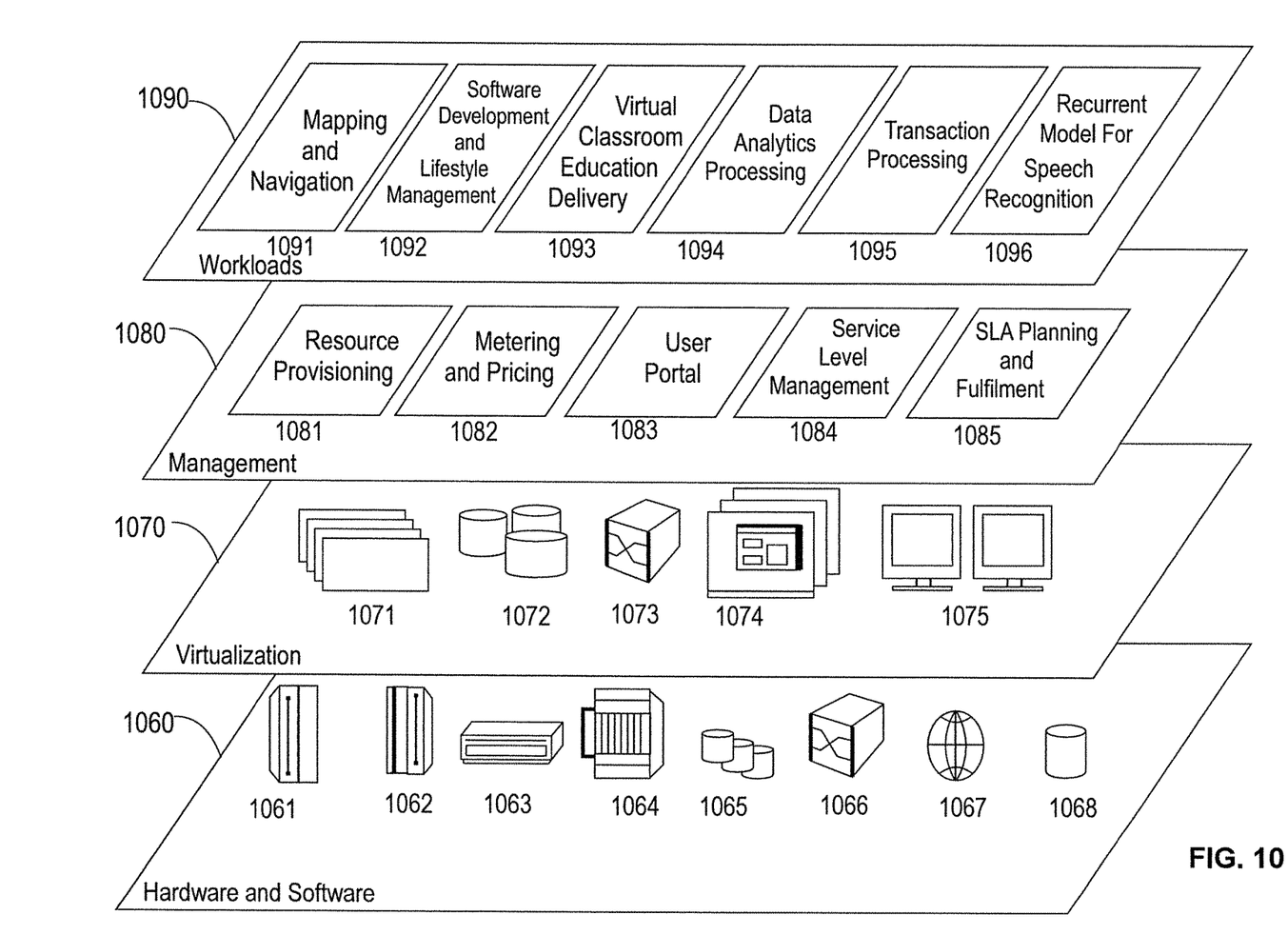
FIG. 10 is a block diagram showing a set of functional abstraction layers provided by a cloud computing environment, in accordance with an embodiment of the present invention.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and speech recognition using feature reconstruction and variants thereof as a regularizer for speech recognition 1096.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A multi-task learning system for speech recognition, comprising:
   a common encoder network;
   a primary network for minimizing a Connectionist Temporal Classification (CTC) loss for speech recognition; and
   a sub network for minimizing a Mean squared error (MSE) loss for feature reconstruction, wherein a first set of output data of the common encoder network is received by both of the primary network and the sub network, and wherein a second set of the output data of the common encoder network is received only by the primary network from among the primary network and the sub network,
   wherein for decoding an acoustic utterance from which the input sequence is derived, an output of the primary network is used while an output of the sub network is discarded.

2. The multi-task learning system of claim 1, wherein, for the first set of output data, the CTC loss is minimized after the MSE loss is minimized.

3. The multi-task learning system of claim 1, wherein, for the second set of output data, only the CTC loss is minimized.

4. The multi-task learning system of claim 1, wherein an input sequence which the common encoder network receives is distorted when minimizing the MSE loss by swapping the former and latter parts of the input sequence.

5. The multi-task learning system of claim 1, wherein an input sequence which the common encoder network receives is distorted when minimizing the MSE loss by stripping a beginning portion and an end portion of the sequence for the feature reconstruction.

6. The multi-task learning system of claim 1, wherein the common encoder network is common to both the primary network and the sub network.

7. The multi-task learning system of claim 1, wherein the common encoder network is a bi-directional Long Short Term Memory network.

8. The multi-task learning system of claim 1, wherein the sub network is a bi-directional Long Short Term Memory network.

9. The multi-task learning system of claim 1, wherein the first set of output data of the common encoder network is randomly selected.

10. A computer-implemented method for speech recognition, comprising:
    outputting, by a common encoder network, a first set of output data and a second set of output data;
    minimizing, by a primary network, a Connectionist Temporal Classification (CTC) loss for speech recognition; and
    minimizing, by a sub network, a Mean squared error (MSE) loss for feature reconstruction, wherein a first set of output data of the common encoder network is received by both of the primary network and the sub network, and wherein a second set of the output data of the common encoder network is received only by the primary network from among the primary network and the sub network,
    wherein for decoding an acoustic utterance from which the input sequence is derived, an output of the primary network is used while an output of the sub network is discarded.

11. The computer-implemented method of claim 10, wherein, for the first set of output data, the CTC loss is minimized after the MSE loss is minimized.

12. The computer-implemented method of claim 10, wherein, for the second set of output data, only the CTC loss is minimized.

13. The computer-implemented method of claim 10, wherein an input sequence which the common encoder network receives is distorted when minimizing the MSE loss by swapping the former and latter parts of the input sequence for the feature reconstruction.

14. The computer-implemented method of claim 10, wherein an input sequence which the common encoder network receives is distorted when minimizing the MSE loss by stripping a beginning portion and an end portion of the sequence for the feature reconstruction.

15. The computer-implemented method of claim 10, wherein the common encoder network is common to both the primary network and the sub network.

16. The computer-implemented method of claim 10, wherein the common encoder network is a bi-directional Long Short Term Memory network.

17. The computer-implemented method of claim 10, wherein the sub network is a bi-directional Long Short Term Memory network.

18. A computer program product for speech recognition, the computer program product comprising a non-transitory computer readable storage medium having program instructions embodied therewith, the program instructions executable by a computer to cause the computer to perform a method comprising:
    outputting, by a common encoder network of the computer, a first set of output data and a second set of output data;

minimizing, by a primary network of the computer, a Connectionist Temporal Classification (CTC) loss for speech recognition; and minimizing, by a sub network of the computer, a Mean squared error (MSE) loss for feature reconstruction, wherein a first set of output data of the common encoder network is received by both of the primary network and the sub network, and wherein a second set of the output data of the common encoder network is received only by the primary network from among the primary network and the sub network, wherein for decoding an acoustic utterance from which the input sequence is derived, an output of the primary network is used while an output of the sub network is discarded.

* * * * *